United States Patent
Jian

(10) Patent No.: US 8,581,967 B2
(45) Date of Patent: Nov. 12, 2013

(54) THREE-DIMENSIONAL (3D) DISPLAY METHOD AND SYSTEM

(75) Inventor: Peiyun Jian, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 354 days.

(21) Appl. No.: 12/954,673

(22) Filed: Nov. 25, 2010

(65) Prior Publication Data

US 2012/0019634 A1  Jan. 26, 2012

(30) Foreign Application Priority Data

Jul. 23, 2010 (CN) .......................... 2010 1 0235272
Jul. 23, 2010 (CN) .......................... 2010 1 0244525
Jul. 23, 2010 (CN) .......................... 2010 1 0244533

(51) Int. Cl.
*H04N 13/04* (2006.01)
*H04N 9/47* (2006.01)

(52) U.S. Cl.
USPC ........................................................... 348/54

(58) Field of Classification Search
USPC ........................................................... 348/54
See application file for complete search history.

(56) References Cited

U.S. PATENT DOCUMENTS

| | | | | |
|---|---|---|---|---|
| 5,726,704 A * | 3/1998 | Uomori | ............ | 348/47 |
| 5,801,760 A * | 9/1998 | Uomori | ............ | 348/47 |
| 5,936,663 A * | 8/1999 | Tabata et al. | ............ | 348/51 |
| 5,945,965 A * | 8/1999 | Inoguchi et al. | ............ | 345/6 |
| 6,005,607 A * | 12/1999 | Uomori et al. | ............ | 348/42 |
| 6,023,277 A * | 2/2000 | Osaka et al. | ............ | 345/419 |
| 6,031,538 A * | 2/2000 | Chupeau et al. | ............ | 345/419 |
| 6,215,590 B1 * | 4/2001 | Okano | ............ | 359/464 |
| 6,285,368 B1 * | 9/2001 | Sudo | ............ | 345/419 |
| 6,501,468 B1 * | 12/2002 | Kaji | ............ | 345/419 |
| 6,545,650 B1 * | 4/2003 | Yamada et al. | ............ | 345/7 |
| 7,319,780 B2 * | 1/2008 | Fedorovskaya et al. | ...... | 382/128 |
| 7,605,776 B2 * | 10/2009 | Satoh et al. | ............ | 345/9 |
| 2002/0005848 A1 * | 1/2002 | Asai et al. | ............ | 345/419 |
| 2002/0122585 A1 * | 9/2002 | Swift et al. | ............ | 382/154 |
| 2003/0025995 A1 * | 2/2003 | Redert et al. | ............ | 359/464 |
| 2004/0066555 A1 * | 4/2004 | Nomura | ............ | 359/462 |
| 2005/0057807 A1 * | 3/2005 | Takagi et al. | ............ | 359/462 |
| 2005/0259323 A1 * | 11/2005 | Fukushima et al. | ......... | 359/462 |
| 2006/0050383 A1 * | 3/2006 | Takemoto et al. | ........... | 359/462 |
| 2006/0203085 A1 * | 9/2006 | Tomita | ............ | 348/51 |
| 2006/0290778 A1 | 12/2006 | Kitaura et al. | | |
| 2009/0079762 A1 * | 3/2009 | Fukushima et al. | ......... | 345/621 |
| 2010/0060720 A1 * | 3/2010 | Hirasawa | ............ | 348/49 |
| 2011/0149050 A1 * | 6/2011 | Imada | ............ | 348/51 |

OTHER PUBLICATIONS

Dodgson et al., Mulit-view Autostereoscopic 3D Display, 1999, ISBN0-9533673-1-2, pp. 497-502.*
Ramachandra et al. Display Dependent Coding for 3D Video on Automultiscopic Displays, 2008, pp. 1-4.*

* cited by examiner

*Primary Examiner* — Sath V Perungavoor
*Assistant Examiner* — Peter D Le
(74) *Attorney, Agent, or Firm* — Anova Law Group, PLLC

(57) ABSTRACT

A method is provided for a three-dimensional (3D) display system. The method includes obtaining a plurality of original images of a plurality of viewpoints in a 3D image for display, and determining an actual size of a display window on a display device configured to display the 3D image. The method also includes adjusting an average parallax value between at least two of the plurality of original images based on the actual size of the display window. Further, the method includes creating a new 3D image with a desired average parallax based on the adjusted plurality of original images, and sending the new 3D image to the display device for display.

12 Claims, 7 Drawing Sheets

THREE-DIMENSIONAL (3D) DISPLAY METHOD AND SYSTEM

CROSS-REFERENCES TO RELATED APPLICATIONS

This application claims the priority of Chinese patent application no. 201010244525.1 filed on Jul. 23, 2010, Chinese patent application no. 201010244533.6 filed Jul. 23, 2010, and Chinese patent application no. 201010235272.1 filed Jul. 23, 2010, the entire contents of all of which are incorporated herein by reference.

FIELD OF THE INVENTION

The present invention relates to three-dimensional (3D) display technologies and, more particularly, to the methods and systems for stereoscopic 3D display.

BACKGROUND

Three-dimensional (3D) display devices often simultaneously display two sets of images with a certain parallax between them on a display screen, so that a user can watch the two sets of images through the left eye and the right eye respectively to perceive 3D images.

3D display technologies generally require a 3D video source to include multiple sets of images with parallax. Currently, various sets of images in a 3D video source are often captured with fixed angles, and the 3D video source is recorded, transmitted, and displayed with fixed frames. Therefore, when a 3D image is displayed on a 3D display screen, the parallax among the various images of the 3D image is also fixed. Further, a viewer may adjust the size of the 3D display screen during displaying, such as adjusting the size of a video playback window on a computer screen, which may result in changes in the parallax among the different sets of images displayed on the screen. When the parallax change exceeds a certain level, the viewer may experience undesired display quality, such as ghosting.

The disclosed methods and systems are directed to solve one or more problems set forth above and other problems.

BRIEF SUMMARY OF THE DISCLOSURE

One aspect of the present disclosure includes a method for a three-dimensional (3D) display system. The method includes obtaining a plurality of original images of a plurality of viewpoints in a 3D image for display, and determining an actual size of a display window on a display device configured to display the 3D image. The method also includes adjusting an average parallax value between at least two of the plurality of original images based on the actual size of the display window. Further, the method includes creating a new 3D image with a desired average parallax based on the adjusted plurality of original images, and sending the new 3D image to the display device for display.

Another aspect of the present disclosure includes a 3D display system. The 3D display system includes a control module, a display module, and a parallax adjusting module. The control module is configured to obtain a plurality of original images of a plurality of viewpoints in a 3D image for display. The display module includes a display device configured to display the 3D image. The parallax adjusting module is configured to determine an actual size of a display window on the display device, and to adjust an average parallax value between at least two of the plurality of original images based on the actual size of the display window. Further, the parallax adjusting module is configured to create a new 3D image with a desired average parallax based on the adjusted plurality of original images, and to send the new 3D image to the display device for display.

Another aspect of the present disclosure includes a computer readable medium containing executable computer instructions for performing a method for a three-dimensional (3D) display system. The method includes obtaining a plurality of original images of a plurality of viewpoints in a 3D image for display, and determining an actual size of a display window on a display device configured to display the 3D image. The method also includes adjusting an average parallax value between at least two of the plurality of original images based on the actual size of the display window. Further, the method includes creating a new 3D image with a desired average parallax based on the adjusted plurality of original images, and sending the new 3D image to the display device for display.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
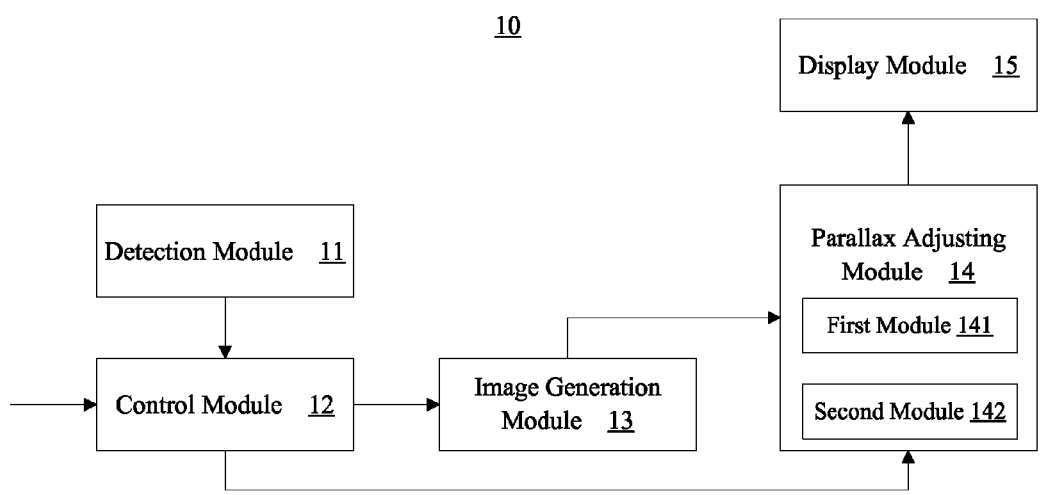
FIG. 1 shows a block diagram of an exemplary 3D display system consistent with the disclosed embodiments.

FIG. 1 shows an exemplary block diagram of a three-dimensional (3D) display system 10. 3D display system 10 may include any appropriate device that capable of processing and displaying 3D images, such as a computer, a television set, a smart phone, or a consumer electronic device. As shown in FIG. 1, 3D display system 10 may include a detection module 11, a control module 12, an image generation module 13, a parallax adjusting module 14, and a display module 15. Other modules or components may also be included.

Detection module 11 may check, detect, and/or collect any appropriate system information about 3D display system 10 and operational information thereof. For example, detection module 11 may detect a particular type of display device of display module 15, and may also determine a total number of sets of images of different viewpoints required by the particular type of display device. Other information may also be detected.

Image generation module 13 may include any appropriate device capable of performing any appropriate image processing related to 3D images. Display module 15 may include any appropriate display screen based on plasma display panel (PDP) display, cathode ray tube (CRT) display, liquid crystal display (LCD), organic light emitting diode (OLED) display, or other types of displays. Display module 15 may also include any appropriate optical devices such as a lenticular lens screen or parallax barrier to facilitate 3D displays.

During display, one or more display windows may be opened on the display screen of display module 15, such as a video playback window or a media play window. Parallax adjusting module 14 may adjust certain parallax parameters of the 3D images based on the different sizes of display windows. Parallax adjusting module 14 may include a first module 141 and a second module 142.

Further, control module 12 may include any appropriate computing device capable of controlling various modules of 3D display system 10 to improve 3D display quality of 3D display system 10.

Figure 2:
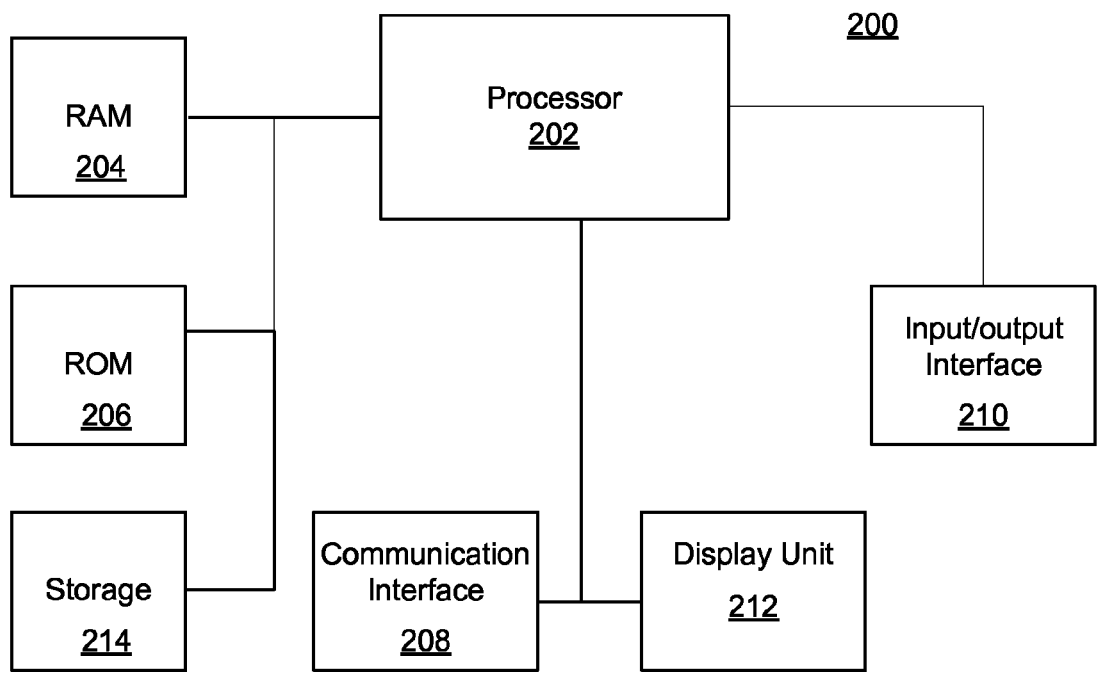
FIG. 2 illustrates another block diagram of an exemplary 3D display system consistent with the disclosed embodiments.

Detection module 11, control module 12, image generation module 13, parallax adjusting module 14, and display module 15 may be implemented in hardware, software, or a combination of hardware and software. FIG. 2 illustrates a block diagram of a computing system 200 implementing various modules of 3D display system 10. As shown in FIG. 2, computing system 200 may include a processor 202, a random access memory (RAM) unit 204, a read-only memory (ROM) unit 206, a communication interface 208, an input/output interface unit 210, a display unit 212, and a storage unit 214. Other components may be added and certain devices may be removed without departing from the principles of the disclosed embodiments.

Processor 202 may include any appropriate type of graphic processing unit (GPU), general purpose microprocessor, digital signal processor (DSP) or microcontroller, and application specific integrated circuit (ASIC). Processor 202 may execute sequences of computer program instructions to perform various processes associated with computing system 200. The computer program instructions may be loaded into RAM 204 for execution by processor 202 from read-only memory 206.

Communication interface 208 may provide communication connections such that computing system 200 may be accessed remotely and/or communicate with other systems through computer networks or other communication networks via various communication protocols, such as transmission control protocol/internet protocol (TCP/IP), hyper text transfer protocol (HTTP), etc.

Input/output interface 210 may be provided for users to input information into computing system 200 or for the users to receive information from computing system 200. For example, input/output interface 210 may include any appropriate input device, such as a remote control, a keyboard, a mouse, an electronic tablet, voice communication devices, or any other optical or wireless input devices. Display unit 212 may include any appropriate display device such as display module 15. Further, storage unit 214 may include any appropriate type of storage medium, such as a CD-ROM, a hard disk, a flash drive, an optical storage, a DVD drive, or other type of storage devices.

Figure 3:
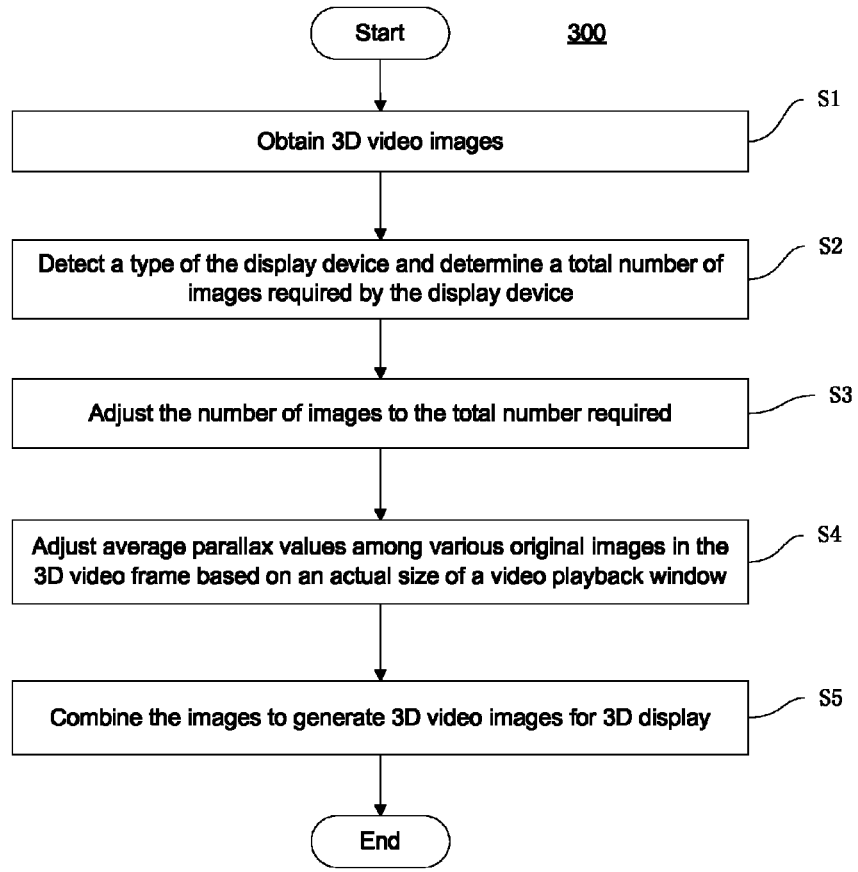
FIG. 3 illustrates an exemplary operational process consistent with the disclosed embodiments.

During operation, 3D display system 10, or processor 202 of computing system 200 implementing the various modules of 3D display system 10, may perform certain processes to display 3D images to one or more users. FIG. 3 shows an exemplary operational process 300 performed by the various modules of 3D display system 10.

As shown in FIG. 3, at the beginning, control module 12 may obtain 3D images (S1). Control module 12 may obtain 3D images from any appropriate sources of 3D video and pictures, such as a DVD or CDROM device, a set top box, a digital receiver, a network adapter, a TV tuner, an information storage device, or other media players.

The 3D images may include at least two sets of images used for 3D display. The 3D video may be in a stereo format, which means a 3D image includes two images from two viewpoints, a first image and a second image. For example, the 3D image includes a first image to be viewed by a viewer's left eye (i.e., a left image) and a second image to be viewed by the viewer's right eye (i.e., a right image), with a certain parallax between the left image and the right image.

The 3D video may also be in a multi-view format, which means that a 3D image includes multiple images from multiple viewpoints. For example, the 3D image may include the first, second, . . . and $N^{th}$ images (N is an integer number greater than 2). A certain parallax exists between two neighboring images of the N images to be viewed by a viewer's left and right eyes respectively.

Figure 4:
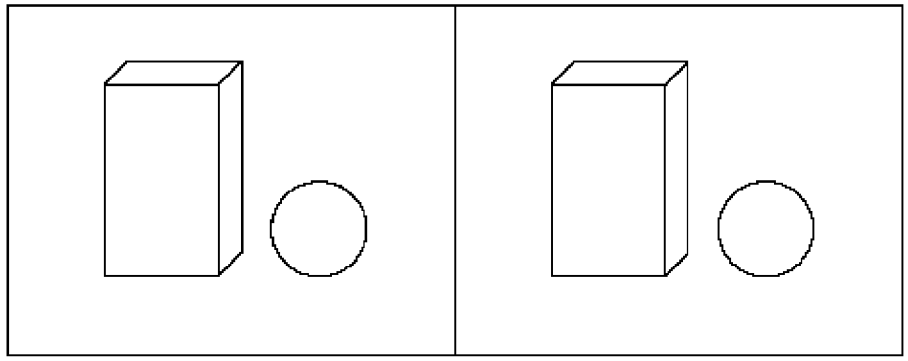
FIG. 4 illustrates exemplary images from different viewpoints consistent with the disclosed embodiments.
Figure 5:
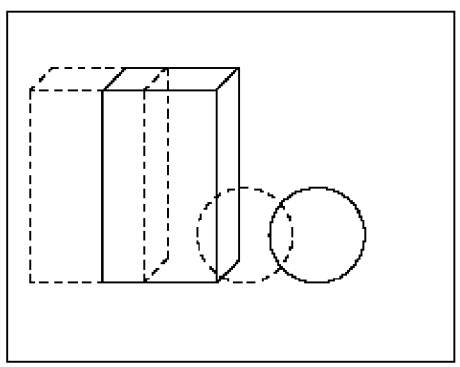
FIG. 5 illustrates a relationship between a 3D image and images from different viewpoints consistent with the disclosed embodiments.

FIGS. 4 and 5 show a relationship between the 3D image, the first image, and the second image (or any two images with certain parallax). As shown in FIG. 4, the left side picture shows a first image, and the right side picture shows a second image. As shown in FIG. 5, the first image and the second image are combined or overlapped together, which shows a disparity between the first image and the second image, i.e., the parallax. Also, the parallax between the first image and the second image may be fixed during production and/or operation.

The stereo-format 3D video data may be stored and transmitted in a certain video format. Also, the 3D video data may be generated by a video capturing device (such as a camera) in real-time or by certain video authoring software. If a video playback program, such as a video-on-demand system, uses DirectShow framework or other applications for video processing, control module 12 may obtain every video frame in real-time. Each frame contains a 3D image. Control module 12 may also determine a total number of images in a video frame and obtain individual images. For example, if there are two images (a stereo video frame), control module 12 may separate a first image and a second image from the 3D video frame data.

After obtaining the images associated with a 3D video frame (S1), detection module 11 may detect a type of the display device and determine a required or desired number of images needed for the particular type of 3D display device (S2). For example, detection module 11 may first detect whether the type of the display device is an autostereoscopic display device or a stereoscopic display device.

Different types of 3D display devices may require different video source formats. For example, a stereoscopic display device may require a viewer to wear special glasses when watching the 3D display. With the help of the special glasses, the stereoscopic display device may only need two images (a stereo format) for displaying a 3D image. On the other hand, for an autostereoscopic display device, a user may watch the 3D display without wearing any special glasses. The autostereoscopic display device thus may need multi-viewpoint video source format and may require multiple images. For example, in order to achieve a desired 3D display, the autostereoscopic display device may need 9 images. Also, certain amount of parallax among the 9 images should be within a certain range. Detection module 11 may determine a total number of images (e.g., 9) required by the particular display device.

Control module 12 may obtain the total number of images required, and adjust the number of images of the current 3D video frame to the total number required (S3). For example, control module 12 may compare the total number of images required by the particular type of display device with the total number of original images in the 3D video frame. If the two numbers match, no adjustment as to the number of images is needed. On the other hand, if the two numbers do not match, control module 12 may adjust the number of original images to match the number as required by the particular display device.

For example, if the number of original images is less than the number required by the particular display device, control module 12 may increase the number of original images by adding additional images such that the two numbers match. This may happen, for example, when using an autostereoscopic display device to display a 3D image made for a stereoscopic display device requiring glasses, or made for another autostereoscopic display device using less number of images.

On the other hand, if the number of original images is greater than the number required by the particular display device, control module 12 may reduce the number of original images by deleting certain images such that the numbers match. This may happen when using a stereoscopic display device to display a 3D image made for an autostereoscopic display device, or when using an autostereoscopic display device to display a 3D image made for another autostereoscopic display device using more number of images.

More particularly, when deleting images, control module 12 may delete those images appearing at the edges of a display screen or a playback or display window. On the other hand, when adding images, control module 12 may determine to generate additional number (i.e., the difference between the original number and the total number required by the display device) of auxiliary images using an interpolation method. Image generation module 13 may generate the additional auxiliary images under the control of control module 12.

Control module 12 may determine certain relationships between the original images, such as a parallax related relationship or other time or space based relationships. For example, if the original 3D video frame is in a stereo format and has two images, while the display device is an autostereoscopic display device requires N images, control module 12 may determine to generate N-2 auxiliary images. Further, control module 12 may determine a parallax relationship between the original first image and the original second image, and create a matching table between the first image and the second image.

Figure 6:
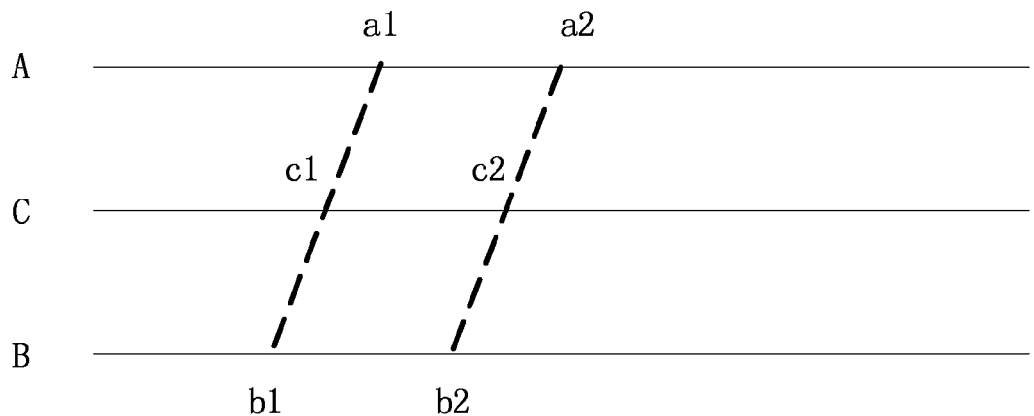
FIG. 6 illustrates an exemplary shifting interpolation approach consistent with the disclosed embodiments.

The matching relationship table may contain a matching relationship between any pair of corresponding points in the first image and the second image, such as respective locations and/or associated parallax distance. After the matching relationship between the first image and second image has been determined, new viewpoints may be inserted and new images may be created based on the first and second images using interpolation. FIG. 6 shows an exemplary shifting interpolation approach consistent with the disclosed embodiments.

As shown in FIG. 6, a stereo format is used in the 3D image, and other formats may also be used. A first image is represented by a plane A, and a second image is represented by a plane B. A matching relationship table is created to reflect the relationship between the first image and the second image. That is, to find in plane B (the second image) points or pixels corresponding to points or pixels in plane A (the first image); or to find in plane A points or pixels corresponding to points or pixels in plane B (the second image). Further, the parallax can also be determined as the distance between the first image and the second image (i.e., an average parallax distance) and/or between each pair of corresponding points in the first image and the second image.

For example, as shown in FIG. 6, point a1 in the first image (plane A) corresponds to point b1 in the second image (plane B); and point a2 in plane A corresponds to point b2 in plane B. The matching relationship is then illustrated by dotted lines a1b1 and a2b2 between plane A and plane B (i.e., respective parallax). All points or pixels in the first image and second image may be matched (unmatched points may be marked as well). Further, a third image of a new viewpoint may be added. The third image may be represented by plane C.

The third image (plane C) may be created through interpolation based on the first image (plane A) and the second image (plane B). For example, a point of the third image corresponding to point a1 in the first image and point b1 in the second image can be derived as the intersection between line a1b1 and plane C, and another point of the third image corresponding to point a2 in the first image and point b2 in the second image can be derived as the intersection between line a2b2 and plane C. Similarly, all points of the third image may be constructed based on the first image and the second image and the relationship between the first and second images. Further, more than one new images may be created based on the first image and the second image and the relationship between the first and second images. Also, more than one new images may be created based on the first image (or the second image) and the created new image and the relationship thereof.

Returning to FIG. 3, after adjusting the number of images in the 3D images (S3), parallax adjusting module 14 may adjust average parallax values among various original images in the 3D video frame based on an actual size of a video playback or display window (S4).

A 3D display device usually combines various images with parallax using certain pixel arrangement algorithms and sends the combined image directly to a display screen. Such combined image with parallax thus can be viewed by a viewer's left and right eyes to perceive a 3D image. Therefore, different images with different parallax may lead the viewer to experience different 3D effects, and to feel the different images having different depth. When parallax between two or more images of an object displayed on a same screen changes, the viewer will feel that the depth of the displayed object also changes.

Figure 7:
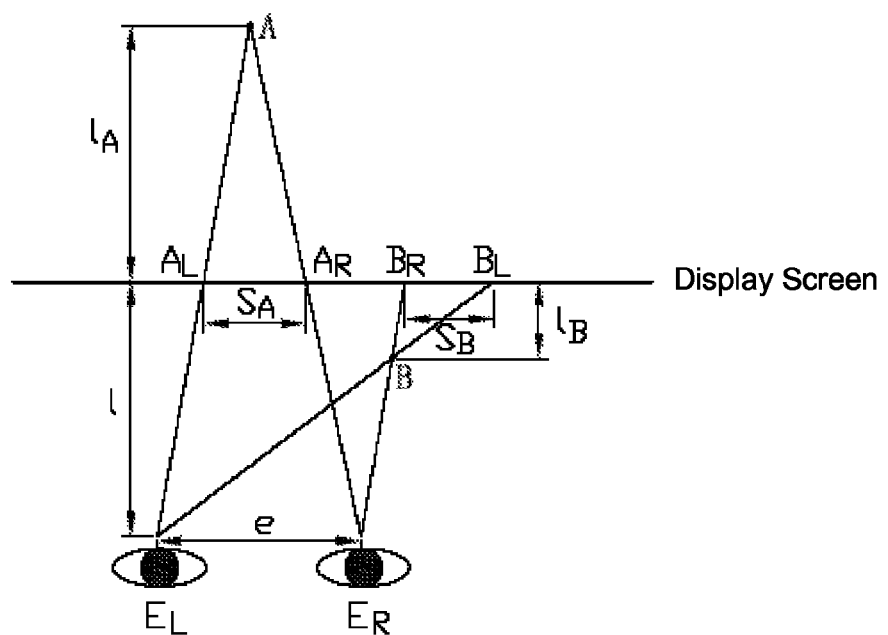
FIG. 7 illustrates exemplary 3D depth-changing effects consistent with the disclosed embodiments.

FIG. 7 illustrates 3D depth-changing effects consistent with disclosed embodiments. As shown in FIG. 7, $E_L$ and $E_R$ are a viewer's left eye and right eye, respectively. $A_L$ and $A_R$ are corresponding points of an object point in the first image and the second image, with a first parallax $S_A$ between them, and $B_L$ and $B_R$ are corresponding points of another object point in the first image and the second image, with a second parallax $S_B$ between them. An object point may refer to a point of a target 3D object in the 3D image. Further, A is a virtual image of $A_L$ and $A_R$ observed by the viewer through both eyes, and B is a virtual image of $B_L$ and $B_R$ observed by the viewer through both eyes. A and B are thus also images of corresponding object points of the target 3D object, respectively.

As shown in FIG. 7, virtual image A appears behind the display screen, and thus has a "recessed" effect; while virtual image B appears in front of the display screen, and thus has a "bulge" effect. The degree of "bulge" or "recessed" is the extent of viewer's perception of the depth, which corresponds to the distance from virtual image A or virtual image B to the display screen, denoted as $I_A$ and $I_B$, respectively.

More particularly, for a particular virtual image, the relationship between the perception of depth and the parallax can be represented as:

$$d = \frac{s \times 1}{s - e} \quad (1)$$

where d is the perception of depth, s is the parallax between the two images (e.g., the first image and the second image), 1 is the distance between the eyes to the display screen, and e is the distance between pupils of the left and right eyes, which is averaged at 65 mm for adults.

Therefore, if any object point corresponding to points in the first image and in the second image with a similar arrangement to that of $A_L$ and $A_R$, that is, with a same direction from $A_L$ to $A_R$ as from left eye $E_L$ to right eye $E_R$, then the image of the object point would be behind the display screen. In other words, the object point has a positive parallax, and a viewer has a perception of a negative depth.

On the other hand, if any object point corresponding to points in the first image and in the second image with a similar arrangement to that of $B_L$ and $B_R$, that is, with an opposite direction from $B_L$ to $B_R$ to the direction from left eye $E_L$ to right eye $E_R$, then the image of the object point would be in front of the display screen. In other words, the object point has a negative parallax, and a viewer has a perception of a positive depth.

Figure 8:
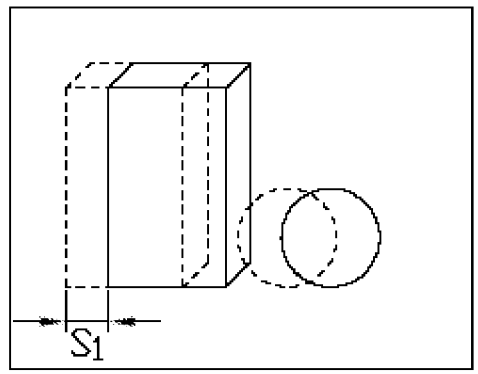
FIG. 8 illustrates an exemplary display window consistent with the disclosed embodiments.
Figure 9:
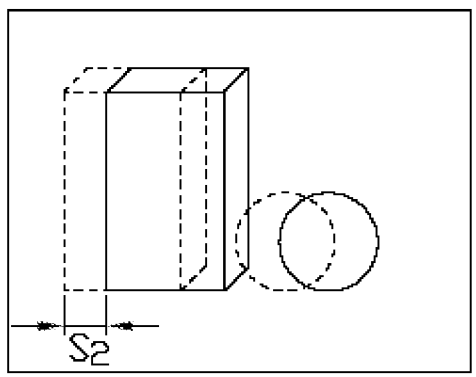
FIG. 9 illustrates another exemplary display window consistent with the disclosed embodiments.

In video production, a 3D video is often made for a specific 3D display device, e.g., a 3D movie is made for a big screen in a 3D cinema. Thus, during a 3D movie production, the position of video production equipment, camera shooting angle, special scene settings, and other factors can give particular values to parallax among different images from different viewpoints in the 3D video. These values are referred as initial parallax values. When the 3D video later is displayed on 3D display devices other than the big screen for which the 3D video was made, the size of the actual 3D display screen for displaying the 3D video may be different than the desired screen size for the 3D video. This may cause difference between the actual parallax among displayed images of various viewpoints and the desired parallax, i.e., the initial parallax values. Further, if the size of a video playback window changes when playing the 3D video, the actual parallax among displayed images of various viewpoints may also change. FIGS. 8 and 9 illustrate such change consistent with the disclosed embodiments.

FIG. 8 and FIG. 9 show two exemplary windows on a display screen (e.g., display module 15) with a screen size (resolution) of 1440×900 in pixels. Other screen sizes may also be used. As shown in FIG. 8, a 3D image is displayed on a playback window with a size of 720×450, the parallax $S_1$ between a first image and a second image is $S_1$=41 (pixels). As shown in FIG. 9, the same 3D image is displayed on the playback window with a size of 1080×675 in pixels, the parallax $S_2$ between the first image and the second image is now $S_2$=61 (pixels).

As explained above and in equation (1), changes in parallax among various images from different viewpoints can change a viewer's perception of image depth. When the perceived depth is out of a certain range, ghosting may occur in the displayed 3D images, which may cause dizziness and other undesired viewing experiences.

Returning to FIG. 3, as previously explained, parallax adjusting module 14 includes first module 141 and second module 142. To adjust the average parallax value, first module 141 may first determine the actual size of the video playback window and other related information, such as original window or screen size and original average parallax, etc. Further, first module 141 may determine parallax changes for the current playback window, and may also determine a scale factor. Second module 142 may adjust the current parallax among various images from different viewpoints by scaling the various images based on the scale factor. Therefore, the actual parallax among the various images may be kept within a certain range to improve 3D display quality and viewer's viewing experience.

More particularly, provided that a 3D image's original screen size is $R_S$, the initial average parallax is $S_S$, and the current playback window actual size is $R_W$, the average parallax $S_W$ for the current playback window can be represented by:

$$S_W = S_S \times \frac{R_W}{R_S} \quad (2)$$

Further, first module 141 may determine a desired average parallax $S_r$ for the current playback window size. To adjust the average parallax value to $S_r$, first module 141 may calculate the scaling factor. The scale factor may be represented as:

$$\text{Scale factor} = \frac{R_S}{R_W} \times \frac{S_r}{S_S} \quad (3)$$

Second module 142 may then process the various images as to scale or adjust the average parallax values among the various images according to the scaling factor. When the actual size of a display window changes, such scaling or adjustment can be performed again to keep the average parallax value within a desired range. New viewpoint positions may be generated based on the scale factor to generate a 3D image with desired average parallax within an acceptable range for a viewer's eyes.

Figure 10A:
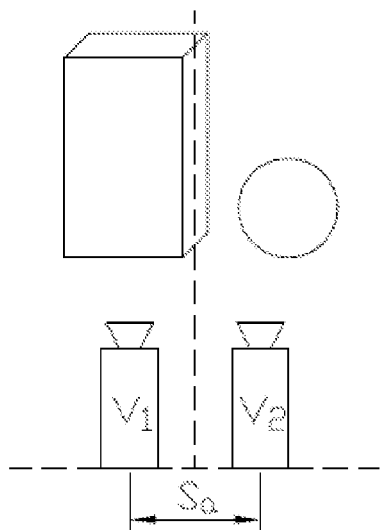
FIG. 10A illustrates exemplary original images in a video 3D frame consistent with the disclosed embodiments.
Figure 10B:
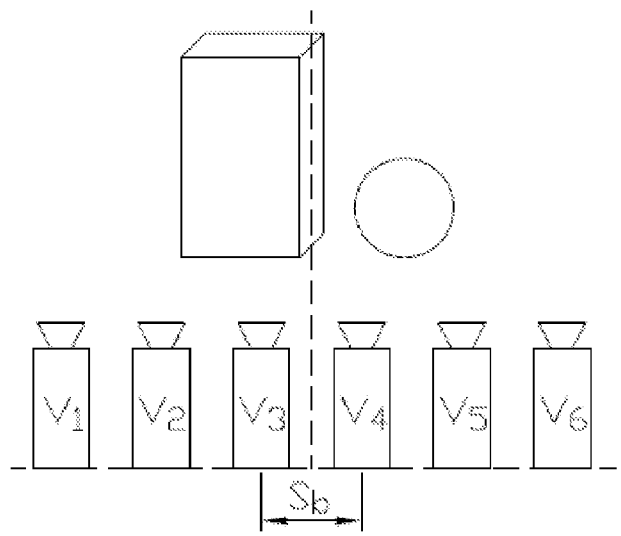
FIG. 10B illustrates exemplary adjusted images of a video 3D frame consistent with the disclosed embodiments.

FIGS. 10A and 10B illustrate a new viewpoint and image generation and scaling example consistent with the disclosed embodiments. As shown in FIG. 10A, an initial 3D image (e.g., a 3D video frame) has two viewpoints V1 and V2, and the distance between two viewpoints is Sa. As shown in FIG. 10B, four (4) additional auxiliary viewpoints and images are created such that a total of six (6) viewpoints, V1, V2, V3, V4, V5, and V6, are used. The distance between two viewpoints now becomes Sb, which is different from Sa. Therefore, a scale factor of (Sb/Sa) is used to create new viewpoint positions and new distance between viewpoints. Various images from the new viewpoint positions may be generated using a traditional camera projection matrix or using a shifting interpolation approach.

It is understood that S3 and S4 are not necessarily performed in sequence, and may be performed independently, separately, or optionally.

After adjusting the average parallax among the various images in the 3D video frame (S4), parallax adjusting module 14 may combine the various images corresponding to all viewpoints to generate 3D images and send the 3D images to display module 15 for 3D display (S5). For example, generation module 13 may combine the various images using certain pixel arrangement algorithms. Other combination methods may also be used.

By dynamically adjusting the number of images according to a particular type of 3D display device, the disclosed systems and methods may provide desired display compatibility, display quality, and efficiency. Other advantages and applications are also obvious to those skilled in the art.

What is claimed is:

1. A method for a three-dimensional (3D) display system, comprising:
    obtaining a plurality of original images of a plurality of viewpoints having an original average parallax in a 3D image for display on a first display device;
    determining an actual size of a display window on a second display device, different from the first display device, configured to display the 3D image;
    determining an actual average parallax value for the display window based on the original average parallax;
    determining a scale factor based on the original average parallax and the actual average parallax value;
    adjusting the actual average parallax value between at least two of the plurality of original images based on the actual size of the display window into a desired average parallax using the scale factor;
    creating a new 3D image with the desired average parallax based on the plurality of original images; and
    sending the new 3D image to the second display device for display,
    wherein creating the new 3D image further includes:
        detecting a type of the second display device for displaying the 3D image;
        determining a total number of required images based on the detected type of the display device and the desired parallax value;
        determining whether the total number of required images is equal to a total number of the plurality of original images;
        when the total number of required images is less than the total number of the plurality of original images, deleting a number of original images at edges of an actual display window such that the total number of required images are provided;
        when the total number of required images is greater than the total number of the plurality of original images, creating a number of auxiliary images based on the original images such that the total number of required images are provided.

2. The method according to claim 1, wherein determining the scale factor and adjusting the actual average parallax value includes:
    calculating the scale factor between the at least two original images based on the actual size of the display window and the original average parallax; and
    generating new viewpoint positions for the 3D image with the desired average parallax based on the scale factor.

3. The method according to claim 2, wherein calculating the scale factor further includes:
    provided that $R_S$ is an original screen size of the 3D image, $S_S$ is the original average parallax, $R_W$ is the actual size of the display window, and $S_r$ is the desired average parallax, calculating the scale factor as:

$$\text{Scale factor} = \frac{R_S}{R_W} \times \frac{S_r}{S_S}.$$

4. The method according to claim 1, wherein creating the number of auxiliary images further includes:
    creating a matching relationship table between at least a first original image and a second original image based on parallax information between the first original image and the second original image; and
    creating an auxiliary image using interpolation between the first original image and the second original image based on the matching relationship table.

5. A three-dimensional (3D) display system, comprising:
    a control module configured to obtain a plurality of original images of a plurality of viewpoints having an original average parallax in a 3D image for display on a first display device;
    a display module having a second display device, different from the first display device, configured to display the 3D image;
    a parallax adjusting module configured to:
        determine an actual size of a display window on the display device based on the original average parallax;
        determine a scale factor based on the original average parallax and the actual average parallax value;
        adjust the actual average parallax value between at least two of the plurality of original images based on the actual size of the display window into a desired average parallax using the scale factor;
        create a new 3D image with the desired average parallax based on the plurality of original images; and
        send the new 3D image to the second display device for display; and
    a detection module configure to:
        detect a type of a display device of the second display module;
        determine a total number of required images based on the detected type of the display device and the desired parallax value,
        determine whether the total number of required images is equal to a total number of the plurality of original images;
        when the total number of required images is less than the total number of the plurality of original images, delete a number of original images at edges of an actual display window such that the total number of required images are provided; and
        when the total number of required images is greater than the total number of the plurality of original images, create a number of auxiliary images based on the original images such that the total number of required images are provided.

6. The 3D display system according to claim 5, wherein, to determine the scale factor and to adjust the actual average parallax value, the parallax adjusting module is further configured to:
    calculate the scale factor between the at least two original images based on the actual size of the display window and the original average parallax; and
    generate new viewpoint positions for the 3D image with the desired average parallax based on the scale factor.

7. The 3D display system according to claim 6, wherein, to calculate the scale factor, the parallax adjusting module is configured to:

provided that $R_S$ is an original screen size of the 3D image, $S_S$ is the original average parallax, $R_W$ is the actual size of the display window, and $S_r$ is the desired average parallax, calculate the scale factor as:

$$\text{Scale factor} = \frac{R_S}{R_W} \times \frac{S_r}{S_S}.$$

8. The 3D display system according to claim 5, further including:
an image generation module configured to:
create a matching relationship table between at least a first original image and a second original image based on parallax information between the first original image and the second original image; and
create an auxiliary image using interpolation between the first original image and the second original image based on the matching relationship table.

9. A non-transitory computer readable medium containing executable computer instructions for performing a method for a three-dimensional (3D) display system, the method comprising:
obtaining a plurality of original images of a plurality of viewpoints having an original average parallax in a 3D image for display on a first display device;
determining an actual size of a display window on a second display device, different from the first display device, configured to display the 3D image;
determining an actual average parallax value for the display window based on the original average parallax;
determining a scale factor based on the original average parallax and the actual average parallax value;
adjusting the actual average parallax value between at least two of the plurality of original images based on the actual size of the display window into a desired average parallax using the scale factor;
creating a new 3D image with the desired average parallax based on the plurality of original images; and
sending the new 3D image to the second display device for display,
wherein creating the new 3D image further includes:
detecting a type of the second display device for displaying the 3D image;
determining a total number of required images based on the detected type of the display device and the desired parallax value;
determining whether the total number of required images is equal to a total number of the plurality of original images;
when the total number of required images is less than the total number of the plurality of original images, deleting a number of original images at edges of an actual display window such that the total number of required images are provided; and
when the total number of required images is greater than the total number of the plurality of original images, creating a number of auxiliary images based on the original images such that the total number of required images are provided.

10. The non-transitory computer readable medium according to claim 9, wherein determining the scale factor and adjusting the actual average parallax value includes:
calculating the scale factor between the at least two original images based on the actual size of the display window and the original average parallax; and
generating new viewpoint positions for the 3D image with the desired average parallax based on the scale factor.

11. The non-transitory computer readable medium according to claim 10, wherein calculating the scale factor further includes:
provided that $R_S$ is an original screen size of the 3D image, $S_S$ is the original average parallax, $R_W$ is the actual size of the display window, and $S_r$ is the desired average parallax, calculating the scale factor as:

$$\text{Scale factor} = \frac{R_S}{R_W} \times \frac{S_r}{S_S}.$$

12. The non-transitory computer readable medium according to claim 9, wherein creating the number of auxiliary images further includes:
creating a matching relationship table between at least a first original image and a second original image based on parallax information between the first original image and the second original image; and
creating an auxiliary image using interpolation between the first original image and the second original image based on the matching relationship table.

* * * * *